United States Patent
Chen et al.

(10) Patent No.: US 7,499,285 B2
(45) Date of Patent: Mar. 3, 2009

(54) CONTROL DEVICE USED FOR A COMPUTER MOTHERBOARD ON WHICH A PLURALITY OF INTERFACE CARDS IS INSERTED

(75) Inventors: Richard Chen, San Jose, CA (US); Alan Lee, Fremont, CA (US)

(73) Assignee: Super Micro Computer, Inc., San Jose, CA (US)

( * ) Notice: Subject to any disclaimer, the term of this patent is extended or adjusted under 35 U.S.C. 154(b) by 0 days.

(21) Appl. No.: 11/790,091

(22) Filed: Apr. 23, 2007

(65) Prior Publication Data

US 2008/0263251 A1    Oct. 23, 2008

(51) Int. Cl.
    H05K 5/00    (2006.01)
(52) U.S. Cl. .................... 361/752; 361/790
(58) Field of Classification Search ............... 361/790, 361/797, 800, 756; 312/223
    See application file for complete search history.

(56) References Cited

U.S. PATENT DOCUMENTS

| | | | | |
|---|---|---|---|---|
| 5,558,522 A | * | 9/1996 | Dent | 439/65 |
| 5,831,821 A | * | 11/1998 | Scholder et al. | 361/686 |
| 5,835,346 A | * | 11/1998 | Albani et al. | 361/684 |
| 6,262,883 B1 | * | 7/2001 | Kim | 361/680 |
| 6,958,916 B2 | * | 10/2005 | Roesner et al. | 361/790 |
| 2003/0099087 A1 | * | 5/2003 | Kao | 361/683 |

* cited by examiner

Primary Examiner—Hung S Bui
(74) Attorney, Agent, or Firm—Troxell Law Office, PLLC

(57) ABSTRACT

A control device used for a computer motherboard on which a plurality of interface cards is inserted, is composed of an L-shape notch which is opened at a corner or a long strip of notch which is opened at a side edge, of a circuit motherboard positioned in an interior of a computer casing of height of 2U or 1U; a riser card, which is inserted vertically into a preset slot of the circuit motherboard; and an interface short card or an interface long card, which can be fitted into the L-shape notch or the long strip of notch, wherein conduction pins of the interface long, short cards can be inserted into a transversal slot of the riser card, and the interface short card or the interface long card approaches to a same horizontal level as the circuit motherboard, such that the riser card can be added with more slots for insertion of more interface long cards or interface short cards.

6 Claims, 4 Drawing Sheets

CONTROL DEVICE USED FOR A COMPUTER MOTHERBOARD ON WHICH A PLURALITY OF INTERFACE CARDS IS INSERTED

BACKGROUND OF THE INVENTION a) Field of the Invention

The present invention relates to a control device used for a computer motherboard on which a plurality of interface cards is inserted, and more particularly to a control device wherein an L-shape notch or a long strip of notch is opened on a standardized circuit motherboard to connect with a standardized PCI (Periphery Component Interconnect) interface short card or PCI interface long card, such that at least more than one interface short card or interface long card can be added more into a computer casing of standard height of 1U (1U is equal to 1.75 in) or 2U.

b) Description of the Prior Art

It is known that in an internal space of a conventional computer casing, especially of height of 2U, interface cards (or expansion cards) are all vertically inserted on a circuit motherboard. Therefore, the circuit motherboard has to be welded with more PCI slots (or ISA (Industry Standard Architecture) slots) to provide for insertion of the interface cards. However, as the PCI slots take large area on a surface of the circuit motherboard, number of interface cards to be inserted will be limited; and in the existing market, at most only four interface cards can be inserted. Therefore, how to utilize the internal space of the circuit motherboard and the computer casing for inserting more interface cards, by using the effective space sufficiently, is a technical issue to be pursued by the present invention.

SUMMARY OF THE INVENTION

The primary object of present invention is to provide a control device used for a computer motherboard on which a plurality of interface cards is inserted, wherein an L-shape notch is opened at a corner of a circuit motherboard, and a riser card is inserted on a PCI slot (or ISA slot) of the circuit motherboard, such that a standardized interface short card can be inserted horizontally into a bottommost slot of the riser card, and can be emplace horizontally into the L-shape notch to approach a same horizontal level as the circuit motherboard, thereby enabling a side surface of the riser card to be added with a plurality of slots for inserting a plurality of overlapped and parallel interface cards in a vertical space of a computer casing.

Another object of the present invention is to provide a control device used for a computer motherboard on which a plurality of interface cards is inserted, wherein a long strip of continuous notch is opened at a side of a circuit motherboard, and a riser card is inserted on a PCI slot (or ISA slot) of the circuit motherboard, such that a standardized interface long card can be inserted horizontally into a bottommost slot of the riser card, and can be emplace horizontally into the long strip of notch to approach a same horizontal level as the circuit motherboard, thereby enabling a side surface of the riser card to be added with a plurality of slots for inserting a plurality of overlapped and parallel interface cards in a vertical space of a computer casing.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
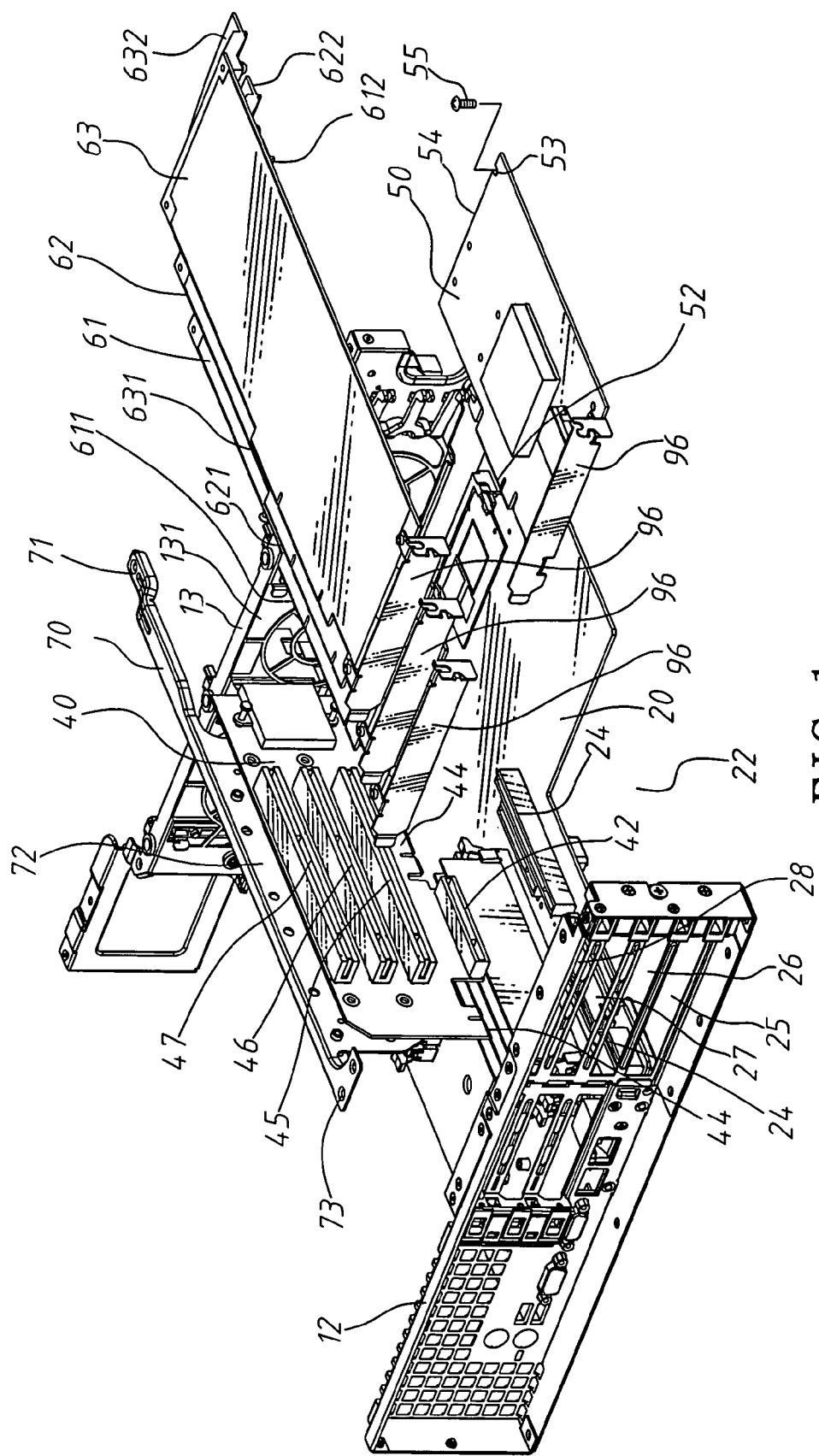
FIG. 1 shows an exploded view the present invention which is implemented to a PCI interface short card.
Figure 2:
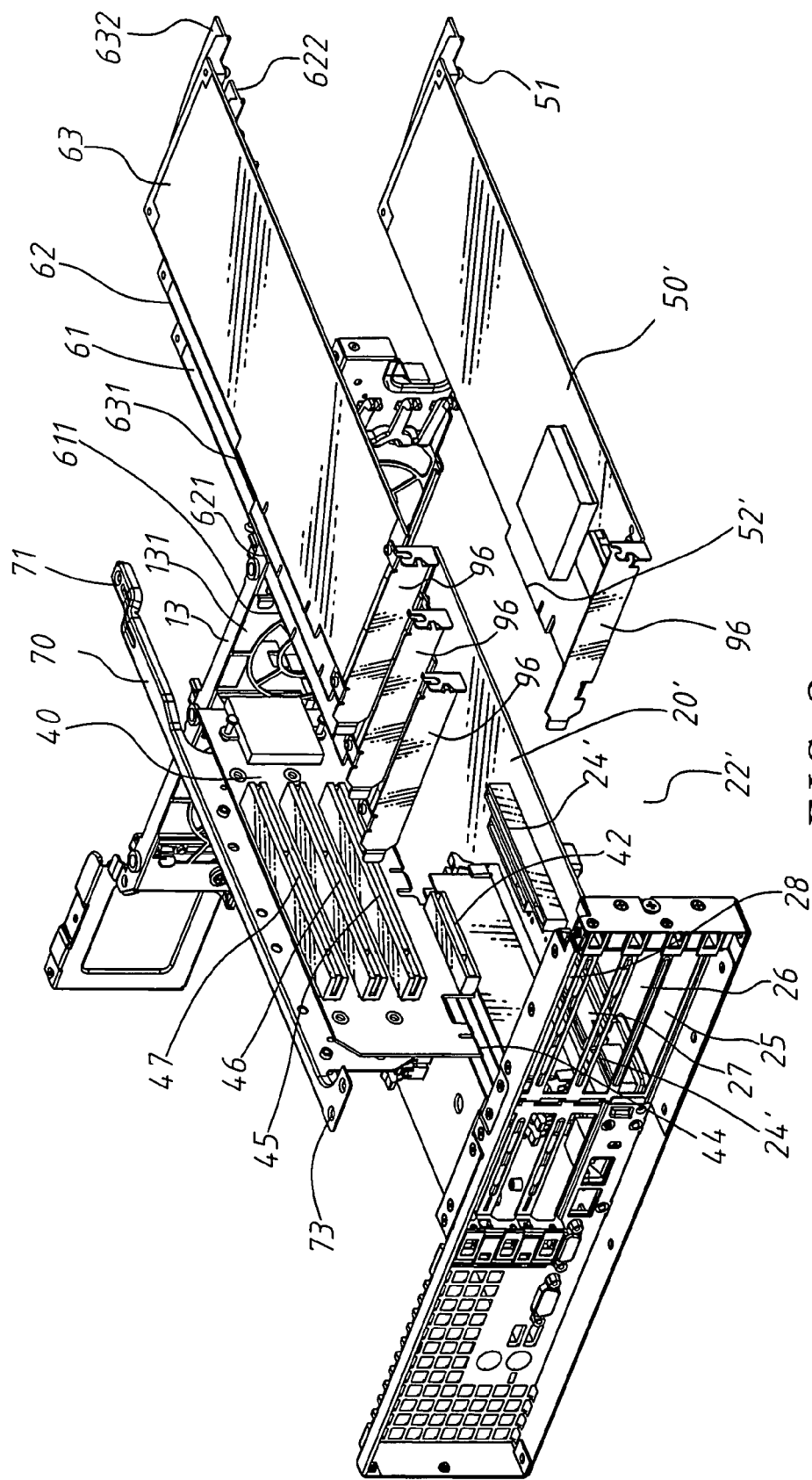
FIG. 2 shows an exploded view of the present invention which is implemented to a PCI interface long card.
Figure 3:
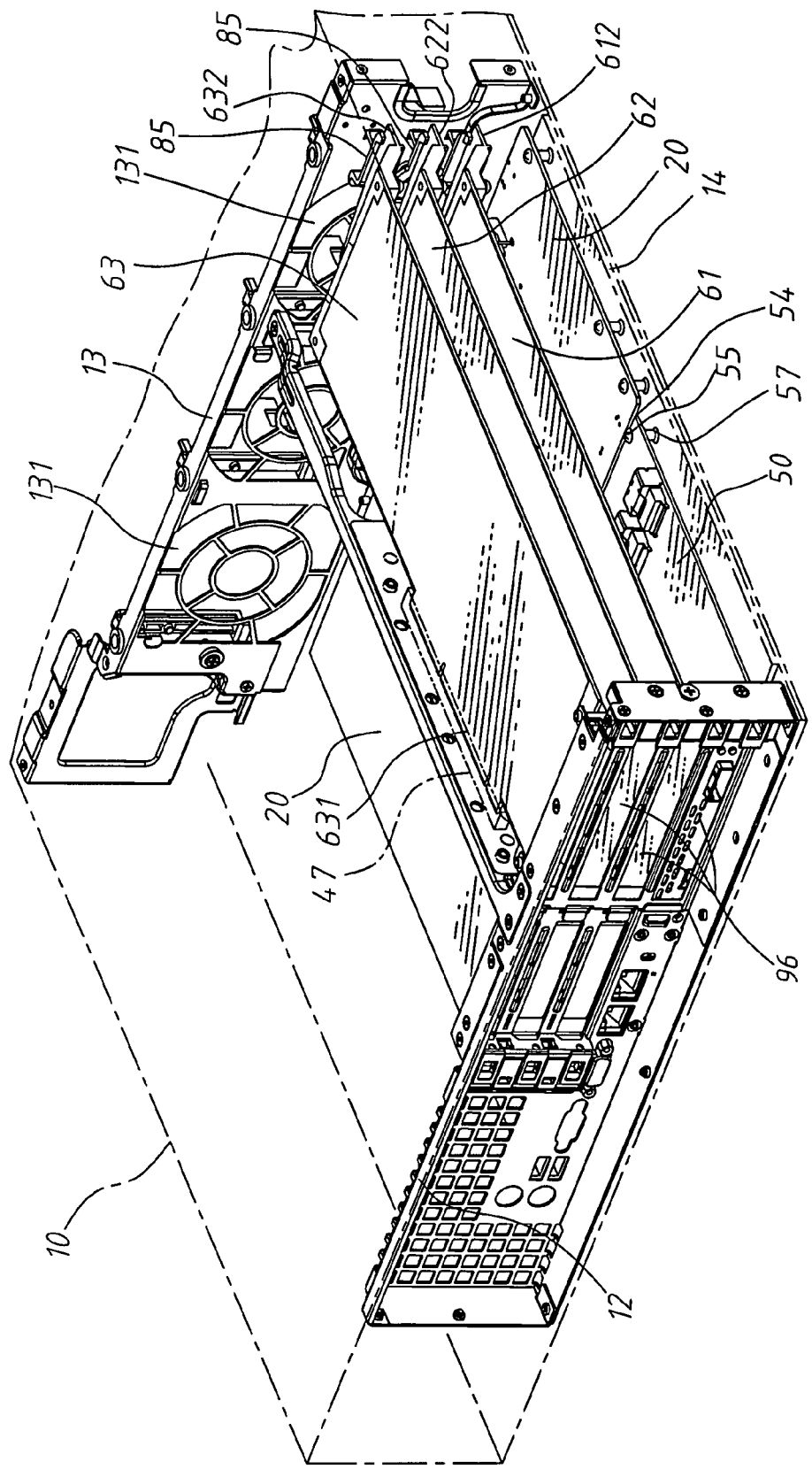
FIG. 3 shows a perspective view of parts of FIG. 1 which are assembled into a computer casing.

Referring to FIG. 1 and FIG. 2, the present invention is to provide a control device used for a computer motherboard on which a plurality of interface cards is inserted, including a circuit motherboard 20 which is connected and fixed on a bottom surface of a computer casing 10, with an L-shape notch 22 being opened at a corner and a vertical slot 24 being welded on a side edge of the L-shape notch 22; a riser card 40, a side surface at a bottom end of which is welded with a transversal slot 42, and a bottom end at a side of which is provided with a conduction pin 44 which inserted into the slot 24 of the circuit motherboard 20, such that the riser card 40 can be positioned vertically on the circuit motherboard 20; and a standardized interface short card 50, an inner end of which is provided with a conduction pin 52 which is inserted into the transversal slot 42, and primary area of which can be emplaced into the L-shape notch 22, such that a surface of the standardized interface short card 50 can approach a same horizontal level as that of the circuit motherboard 20 (as shown in FIG. 3).

Referring to FIG. 1, a side surface above the transversal slot 42 of the riser card 40 is welded respectively with a plurality of transversal slots 45, 46, 47. Conduction pins 611, 621, 631 of a plurality of standardized interface long cards 61, 62, 63, are inserted respectively into the plural transversal slots 45, 46, 47, such that the plural interface long cards 61, 62, 63 can be overlapped with and parallel to one another and be located above the standardized interface short card 50, as well as be located in an internal space of the computer casing 10.

Referring to FIG. 1, the computer casing 10 is especially provided with the following parts:

(a) An I/O board 12, which is provided with an I/O connection interface and is located at a side of the computer casing 10 to serve as a connection interface of I/O;

(b) A frame 13, which is provided with a ventilation hole 131 and is located in the internal space of the computer casing 10; and a connection element 70, which is provided with a vertical board 72 for connecting and fixing the riser card 40, with a front connection end 71 of the connection element 70 being screwed on the frame 13, and a rear connection end 73 being screwed on the I/O board 12.

The slots 24 of the circuit motherboard 20 are divided into a left and a right set. The conduction pins 44 at the bottom end at the side of the riser card 40 are divided into a left and a right set, and the two sets of conduction pins 44 are inserted into the two sets of slots 24.

Height of the computer casing 10 is standardized height of 2U.

Figure 4:
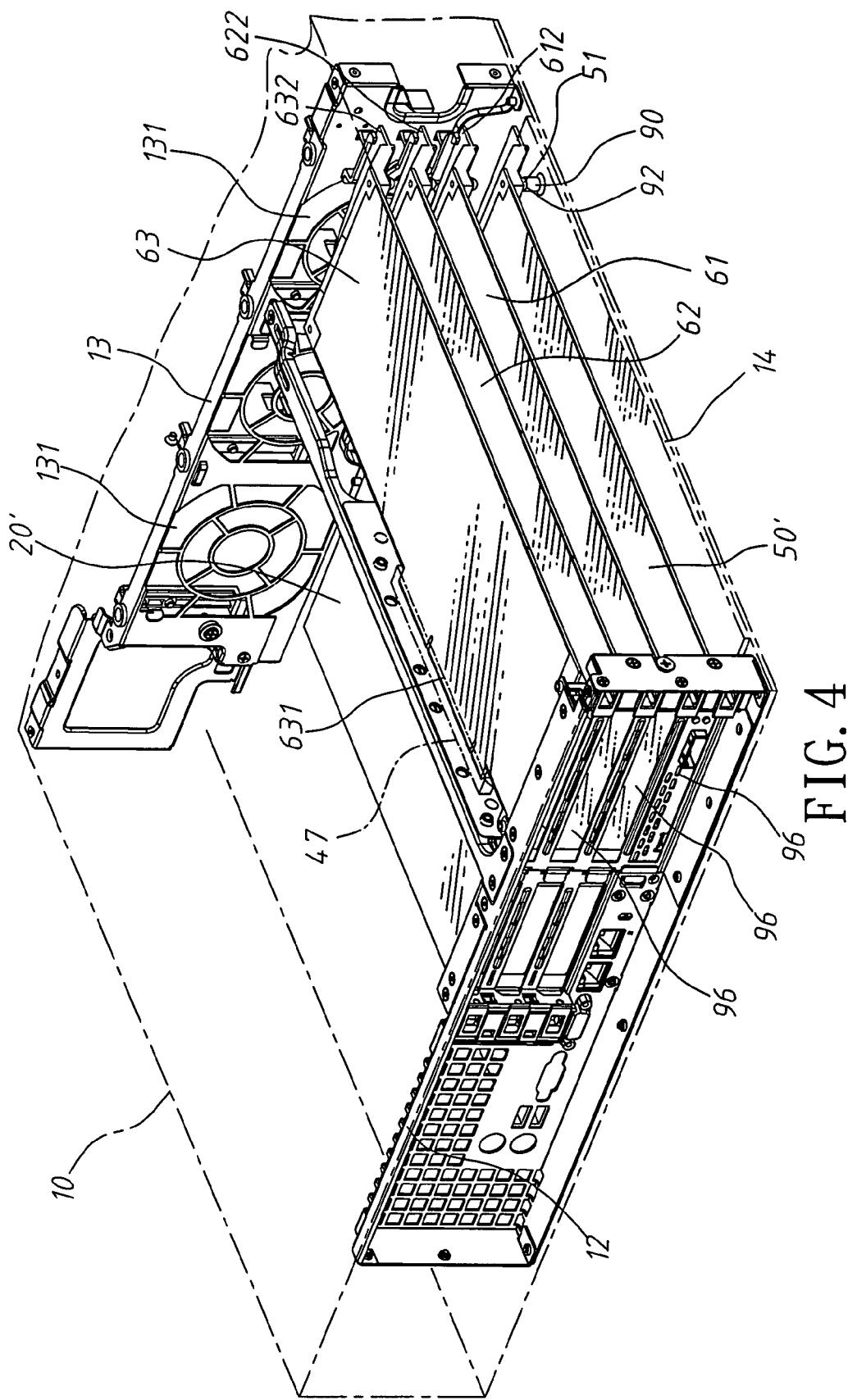
FIG. 4 shows a perspective view of parts of FIG. 2 which are assembled into a computer casing.

Referring to FIG. 2 and FIG. 4, it shows another embodiment of the present invention, including a circuit motherboard 20', which is connected and fixed on a bottom surface of a computer casing 10, and a side of which is formed with a long strip of continuous notch 22', with a side edge of the long strip of notch 22' being welded with a vertical slot 24'; a riser card 40, a side surface at a bottom end of which is welded with a transversal slot 42, and a bottom end at a side of which is provided with a conduction pin 44 which is inserted into the slot 24' of the circuit motherboard 20', such that the riser card 40 can be positioned vertically on the circuit motherboard 20'; and a full length, full height, standardized interface long card 50', an inner end of which is provided with a conduction pin 52', and primary area of which can be emplaced in the long strip of notch 22', such that a surface of the standardized interface long card 50' can approach to a same horizontal level as that of the circuit motherboard 20'.

Referring to FIG. 1, an L-shape notch 22 is opened at a corner of a circuit motherboard 20. Size of the L-shape notch 22 can exactly provide for emplacement of a standardized interface short card 50 (PCI Express Card Low Profile Half Length) which is provided with length of about 170 mm, and maximum width of about 111.2 mm.

A side end of the interface short card 50 is provided with a conduction pin 52 which can be exactly inserted into a transversal slot 42 at a bottommost of a riser card 40, so as to position the interface short card 50 into the transversal slot 42 for forming electrical connection, thereby accomplishing an extraordinary function; that is, a surface of the interface short card 50 after being positioned approaches to a same horizontal level as that of the circuit motherboard 20, wherein a side end of the interface short card 50 is provided with a through-hole 53. Referring to FIG. 3, a region which is bounded by imaginary lines is the computer casing 10, a side connection edge 54 of the interface short card 50 is closely next to a side board of the circuit motherboard 20, and a bolt 55 is screwed into the through-hole 53 and a pillar 57 which is positioned between a bottom board 14 and the interface short card 50, so as to position the interface short card 50, and fixedly connect the metallic bottom board 14 on a bottom surface of the computer casing 10.

As the interface short card 50 and the circuit motherboard 20 approach to the same horizontal level, a side surface of the vertical riser card 40 can be provided with at least more than three PCI or ISA transversal slots 45, 46, 47, which can be inserted with three full height, full length interface long cards 61, 62, 63. These three interface long cards 61, 62, 63 are parallel to one another and are positioned at a space above the circuit motherboard 20 and the interface short card 50. Therefore, by the present invention, one interface short card 50 and three interface long cards 61, 62, 63 can be positioned at the L-shape notch 22 of and the space above the circuit motherboard 20, which utilizes sufficiently the space of the circuit motherboard 20 and the space above the circuit motherboard 20, to cleverly configure with a plurality of interface cards.

Referring to FIG. 2, a long strip of notch 22' of a circuit motherboard 20' is in a shape of long strip, and the circuit motherboard 20' is removed with one CPU and related circuit layout from an original configuration of two CPUs, in order to lengthen the long strip of notch 22'. A full length, full height, standardized interface long card 50' is provided with length of about 314 mm, and maximum width of about 107 mm. A conduction pin 52' of the interface long card 50' is inserted into the transversal slot 42, which further positions the interface long card 50' into the long strip of notch 22', and enables a surface of the interface long card 50' to approach to a same horizontal level as that of the circuit motherboard 20'.

Referring to FIG. 4, the bottom board 14 is provided with at least more than one insulation pillar 90, and a top part 92 of which is abutted at a front end 51 of the interface long card 50', enabling the interface long card 50' to approach a same horizontal level as the circuit motherboard 20'.

On the other hand, positioning plates 612, 622, 623 which are fixed at tail ends of the interface long cards 61, 62, 63 above the interface long card 50' are inserted into clipping slots of elastic members 85. As the elastic members 85 are a conventional art and also a feature to be pursued by the present invention, further description is not needed. Furthermore, front ends of the four interface long cards 50', 61, 62, 63 are fixedly connected with metal covers 96 to correspond to long grooves 25, 26, 27, 28 of an I/O board 12. These covers 96 can be opened with all kinds of plugs or sockets (not shown in the drawing) of I/O interfaces to externally connect to a connection element.

Therefore, by the present invention, the interface long cards 50', 61, 62, 63 can be also emplaced into the long strip of notch 22', such that the internal space of the computer casing 10 can be installed with four interface long cards 50', 61, 62, 63 that are overlapped with and parallel to one another, which utilizes sufficiently the internal space of the computer casing 10 of height of 2U.

Accordingly, by the present invention, at least four interface long cards or interface short cards that are overlapped with and parallel to one another can be installed in a vertical space, thereby improving their functions of usage.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A control device used for a computer motherboard on which a plurality of interface cards is inserted:
    a circuit motherboard which is connected and fixed on a bottom surface of a computer casing, with an L-shape notch being opened at a corner of the circuit motherboard, and a side edge of the L-shape notch being welded with a vertical slot;
    a riser card, a side surface at a bottom end of which is welded with a transversal slot, and a bottom end at a side of which is provided with a conduction pin which is inserted into the slot of the circuit motherboard, enabling the riser card to be positioned vertically on the circuit motherboard; and a standardized interface short card, an inner end of which is provided with a conduction pin which is inserted into the transversal slot, and
    primary area of which is emplaced into the L-shape notch, such that a surface of the standardized interface short card is substantially on a same horizontal plane as that of the circuit motherboard.

2. The control device used for a computer motherboard on which a plurality of interface cards is inserted, according to claim 1, wherein a side surface above the transversal slot of the riser card is welded respectively with a plurality of transversal slots, and conduction pins of a plurality of standardized interface long cards are inserted respectively into the plural transversal slots, enabling the plural interface long cards to be overlapped with and parallel to one another, and to be located above the standardized interface short card, as well as to be located in an internal space of the computer casing.

3. The control device used for a computer motherboard on which a plurality of interface cards is inserted, according to claim 1, wherein the computer casing includes especially the following parts: (a) an I/O board, which is provided with an I/O connection interface, being located at a side of the computer casing to serve as a connection interface of I/O; (b) a frame, which is provided with a ventilation hole, being located in the internal space of the computer casing; and a connection element, which is provided with a vertical board for connecting and fixing the riser card, with a front connection end of which being screwed on the frame, and a rear connection end of which being screwed on the I/O board.

4. The control device used for a computer motherboard on which a plurality of interface cards is inserted, according to claim 1, wherein the slots of the circuit motherboard are divided into a left and a right set, the conduction pins located at the bottom end at the side of the riser card are divided into a left and a right set, and the two sets of conduction pins are inserted into the two sets of slots.

5. The control device used for a computer motherboard on which a plurality of interface cards is inserted, according to claim 1, wherein height of the computer casing is standardized height of 2U.

6. A control device used for a computer motherboard on which a plurality of interface cards is inserted, comprising a circuit motherboard, which is connected and fixed on a bottom surface of a computer casing, a side of which is formed with a long strip of continuous notch, with a side edge of the long strip of notch being welded with a vertical slot; a riser card, a side surface at a bottom end of which is welded with a transversal slot, and a bottom end at a side of which is provided with a conduction pin which is inserted into the slot of the circuit motherboard, such that the riser card is positioned vertically on the circuit motherboard; and a full length, full height, standardized interface long card, an inner end of which is provided with a conduction pin, and primary area of which is emplaced into the long strip of notch, such that a surface of the standardized interface long card is substantially on a same horizontal plane as that of the circuit motherboard.

* * * * *